United States Patent [19]

Petsch

[11] Patent Number: 4,600,983
[45] Date of Patent: Jul. 15, 1986

[54] DIGITAL CURRENT REGULATOR CIRCUIT FOR CONTROL OF BIDIRECTIONAL CURRENT FLOW THROUGH A LOAD

[76] Inventor: Johann Petsch, Anzinger Strasse 30, D-8011 Poing, Fed. Rep. of Germany

[21] Appl. No.: 445,218

[22] Filed: Nov. 29, 1982

[30] Foreign Application Priority Data

Dec. 2, 1981 [DE] Fed. Rep. of Germany ....... 3147731

[51] Int. Cl.[4] ............................................. H02P 13/32
[52] U.S. Cl. ..................................... 363/63; 318/341; 318/599; 363/98
[58] Field of Search .................. 363/63, 98, 124, 132; 318/341, 344, 345 B, 345 E, 599

[56] References Cited

U.S. PATENT DOCUMENTS

| 3,320,514 | 5/1967 | Lawrence | 363/162 |
|---|---|---|---|
| 3,515,977 | 6/1970 | Diczhazy | 363/162 |
| 3,551,782 | 12/1970 | Maynard | 363/63 |
| 3,764,885 | 10/1973 | Buxbaum et al. | 363/63 |
| 4,314,325 | 2/1982 | Siebert | 363/98 |
| 4,409,527 | 10/1983 | Sommeria | 318/341 |
| 4,454,573 | 6/1984 | Petsch et al. | 363/98 |

FOREIGN PATENT DOCUMENTS

| 1222155 | 8/1966 | Fed. Rep. of Germany . |  |
|---|---|---|---|
| 1513181 | 10/1969 | Fed. Rep. of Germany . |  |
| 1588783 | 12/1970 | Fed. Rep. of Germany . |  |
| 2042107 | 3/1972 | Fed. Rep. of Germany . |  |
| 2930907 | 2/1981 | Fed. Rep. of Germany . |  |
| 917178 | 3/1982 | U.S.S.R. | 363/98 |

Primary Examiner—William H. Beha, Jr.

[57] ABSTRACT

A digital current regulator circuit for a DC load that is connected within a transistor bridge circuit for multi-quadrant operation contains a digital comparator to which binary actual value codes and theoretical value codes are applied as well as a control unit for the time-discrete unipolar control of the transistors in dependence on a central timing signal. To avoid current distortions when the polarity of the load current changes, a blocking circuit is provided, by means of which the bridge circuit can be blocked when the polarity of the theoretical value code changes. A release circuit is also provided that terminates the blockage as soon as the load current actually becomes zero.

8 Claims, 2 Drawing Figures

FIG. I

DIGITAL CURRENT REGULATOR CIRCUIT FOR CONTROL OF BIDIRECTIONAL CURRENT FLOW THROUGH A LOAD

CROSS REFERENCE TO RELATED APPLICATIONS

A related application is application Ser. No. 406,477, filed Aug. 9, 1982 for "Current Regulator Circuit" and assigned to the assignee of the present invention. Such application is incorporated herein by reference.

BACKGROUND ART

This invention concerns a digital current regulator circuit.

In the prior art, patent publication DE-OS No. 29 30 907 discloses a method for controlling, for example, a motor by pulse-width modulation with a transistor bridge in four-quadrant operation. In such system, for each direction of the load current, one of the transistors is activated with a continuous signal. This is supposed to reduce the ripple in the load current. Patent publication DE-OS No. 29 30 920 discloses a similar method in which the transistors that are diagonally opposite in the bridge are timed with a time displacement such that, for each direction of the load current, only two diagonally opposite transistors are activated. As a result, the safety pause that would otherwise be required between all switch-on pulses is required only when the load current changes polarity. In this way, too, the ripple of the load current and furthermore the linearity of the control characteristic are supposed to be improved.

These methods, however, use conventional analog technology. Compared to conventional systems which work in analog fashion with pulse-width modulation, a digital current regulator circuit has significant advantages. These include a large bandwidth in the regulator circuit because the entire system can be controlled by a central timer with a high timing frequency such as 100 kHz or more; optimum utilization of the performance capability of the power switches because of high regulation precision and practically delay-free activation; and an essentially linear regulator characteristic. With "time-discrete" activation of the power switches, digital regulation also permits a considerable reduction in the expenditure for customary relief networks for the power switches. In the case of four-quadrant operation, relief networks can be dispensed with entirely for two out of the four quadrants.

Another problem in prior art control circuits relates to current distortions when there is a change in the current direction through the load. When the polarity of the theoretical current value changes, the current direction in the bridge is immediately switched over in response to the output voltage of an analog comparator stage. In such circumstances, disturbances and undesirable current distortions can result. Especially when the motor is running relatively slowly, these become noticeable as speed errors of a considerable percentage.

DISCLOSURE OF THE INVENTION

In the present invention, a digital current regulator circuit is used to minimize these problems. The circuit comprises a transistor bridge circuit arranged for a multiquadrant operation, means for deriving a binary actual value code representative of the current through a load connected at the output of the bridge circuit, means for generating a theoretical value code representative of the desired current flow in said load, a digital comparator for comparing the actual value code and the theoretical value code and producing output signals representing the result of such comparison, and a control unit for the time-discrete unipolar control of said bridge transistors in accordance with a central timing signal. To avoid current distortions when there is a change in the polarity of the current through the load, a blocking circuit is provided which blocks the bridge circuit when the polarity of the theoretical value code changes. A release circuit terminates this blockage as soon as the motor current reaches a desired predetermined value at which the change in current direction may be made essentially free of interference and distortion. Typically, this predetermined value is zero current through the load.

In addition to the advantages mentioned above which are obtained from digitalization, the invention achieves complete symmetry about the zero current value, within the framework of the selected timing frequency. This advantage is especially significant, for example, in the case of the motor control of precision machines.

The current regulator circuit described here is in principle suited for arbitrary bridge circuits and also for two- or six-quadrant operation. Only for the sake of example is it explained below in combination with a bridge circuit for a DC motor which works in four-quadrant operation.

BRIEF DESCRIPTION OF THE DRAWINGS

These and other objects, features and advantages of the invention will be more readily apparent from the following description of the best mode of carrying out the invention in which.

BEST MODE FOR CARRYING OUT THE INVENTION

Figure 1:
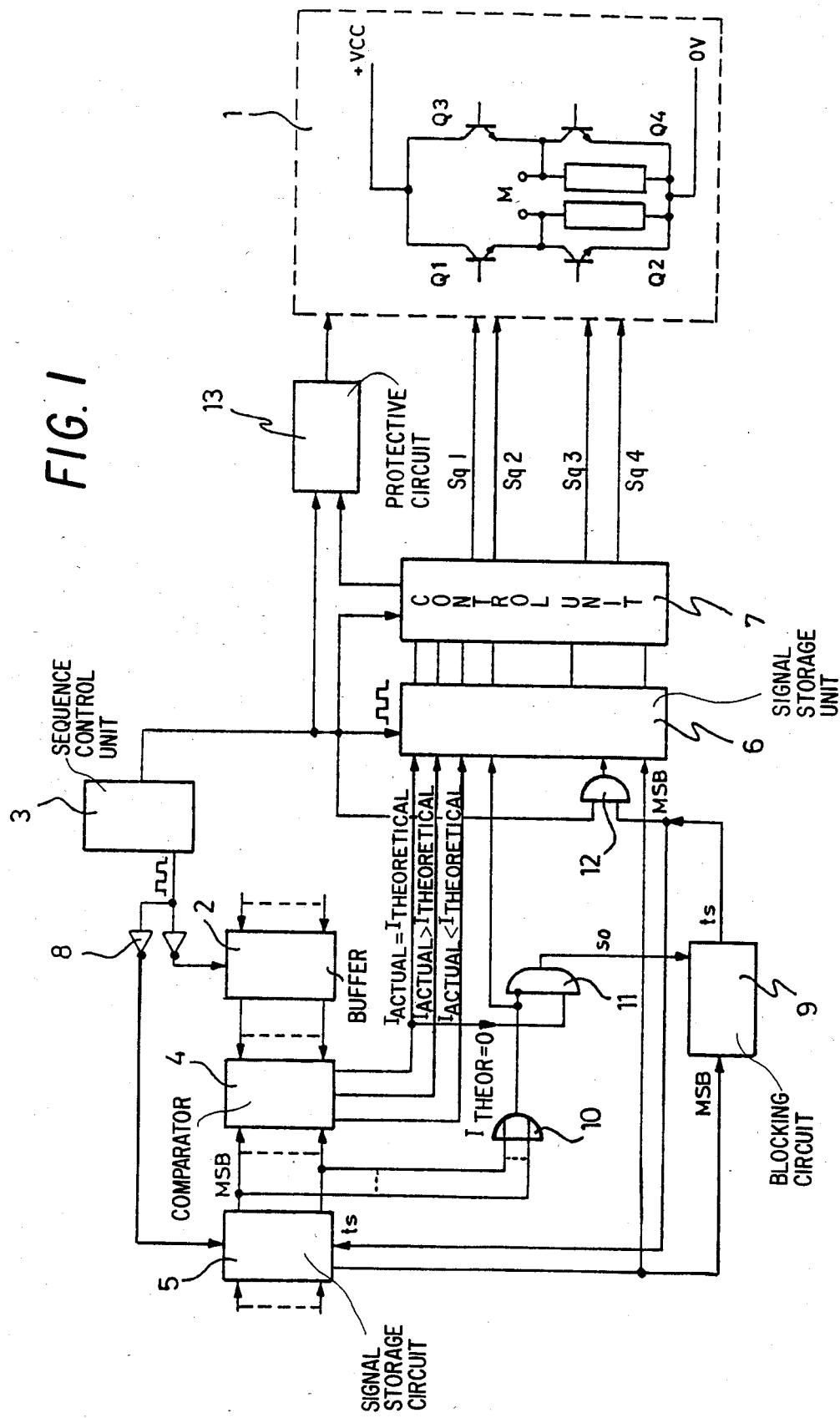
FIG. 1 is a block diagram of apparatus used in carrying out the invention.

As shown in FIG. 1 of the drawing, the present invention is used in a current regulator circuit comprising a power driver stage 1, a buffer 2, a timer or sequence control unit 3, a binary comparator 4, and a controllable binary signal-storage circuit 5. These elements are similar to power driver stage LS, the buffer at the actual value input to comparator 20, sequence control circuit 32, comparator 20, and binary circuit 26 in the above-referenced application for "Current Regulator Circuits". As will be discussed below, power driver stage 1 is DC-isolated from the other elements of the drawing which constitute a control stage.

Power driver stage 1 comprises power transistors $Q_1$, $Q_2$, $Q_3$ and $Q_4$ which are connected to form a bridge. Relief networks EN are provided for transistors $Q_2$ and $Q_4$. A load such as a DC motor in connected in familiar fashion between the terminals M. The bridge is connected to a voltage source $+V_{cc}$ which can be connected directly to existing AC or three-phase mains. This connection is preferably made through a rectifier and smoothing circuit (not shown) without a power transformer.

As described in greater detail in "Current Regulator Circuits", current through the DC load is sensed by measuring the voltage drop across a resistor and the resulting analog signal is converted to a digital signal by an A/D converter (not shown). To ensure that this apparatus is DC-isolated from buffer 2, this digital signal, which is also called an actual value code, is conducted in parallel through optocouplers (not shown) or in series through optical fiber conductors (not shown), from the power driver stage 1 to buffer 2. The bits of this code can then be applied in parallel to the actual value inputs of binary comparator 4.

A second input to comparator 4 is a theoretical value code consisting of parallel bits which is supplied by binary signal storage circuit 5. The theoretical value code specifies the current that is supposed to flow in the motor or other load. The theoretical value code may vary depending on the particular application and may be generated, for example, in accord with a computer program or in accord with a prescribed alteration curve. Because this value is a binary value, this can be done relatively easily. In the example under consideration, which involves a motor control, the theoretical value can be the allowed peak value of the motor.

Comparator 4 always produces an output signal at one of its three outputs, indicating if the actual value, $I_{ACTUAL}$, of the current is larger or smaller than the theoretical value, $I_{THEORETICAL}$, or if it is equal thereto. These binary output signals are applied to a control unit 7 by a signal storage unit 6, under the control of timer 3. The binary output signals sq1 through sq4 of control unit 7 activate the driver circuits (not shown) of the power transistors $Q_1$ through $Q_4$, which are contained in the power driver stage 1. The output signals sq1 through sq4 can likewise be transmitted through optocouplers or through transmitters into the DC-isolated power driver stage 1.

To provide for precise time synchronization of the overall system, each of the circuits that is timed by the timer 3, is controlled by the same edge, for example the rising edge, of the timing signal. Naturally, these edges may also be delayed by gate elements or the like. In the example shown, however, the timing pulses are conducted to buffer 2 and signal storage circuit 5 respectively through inverter elements 8. As a consequence, the actual and theoretical value codes are compared at a time that is phase shifted by 180° with respect to the time of delivery of the comparison results to control unit 7. During half the timer period, the theoretical and actual value information codes overlap, i.e. are available simultaneously, which is long enough for them to be compared reliably.

According to the principle of unipolar time-discrete activation of the power transistors, a principle which is used here and which differs from the conventional principle of pulse-width modulation, the power transistors $Q_1$ through $Q_4$ can be switched on and off only at the times defined by the timing signal and can have the following conducting state for the case of positive current direction at the terminals M:

$Q_2$ and $Q_3$ always blocking or off;
$Q_1$ always conducting;
$Q_4$ conducting if $I_{ACTUAL} < I_{THEORETICAL}$;
$Q_4$ blocking if $I_{ACTUAL} > I_{THEORETICAL}$.

On the other hand, for the case of negative current direction at terminals M:

$Q_1$ and $Q_4$ always blocking;
$Q_3$ always conducting;
$Q_2$ conducting if $I_{ACTUAL} < I_{THEORETICAL}$;
$Q_2$ blocking if $I_{ACTUAL} > I_{THEORETICAL}$.

For a given current direction, therefore, the current intensity is regulated with only one of the four power transistors. In the case of a positive current direction this regulating transistor is transistor $Q_4$. This transistor, for example, can remain conducting for one or for a few timing periods when the motor accelerates with peak current and also during design-speed operation, where the current is generally lower, in dependence on the load or motor inductance. With each timing pulse, comparator 4 determines whether the theoretical value has been reached or has already been exceeded. As appropriate, the transistor $Q_4$ blocks for one or more timing periods, until the current again reaches the theoretical value or falls below it, etc.

In prior art regulator circuits, if the theoretical value code changes its polarity, for example, if the theoretical value code at the input of a comparator circuit such as comparator 4 requires a negative load current as opposed to a previously positive current, the bridge in the power driver stage is automatically switched over during the next timing pulse. This procedure, however, can lead to nonlinearities, if the current at this time still has a positive value.

In accordance with the invention, this switchover is blocked until the load current has reached a reference value at which the switchover can be made with minimal interference and distortion. In practice, this reference value typically is zero, that is, no current flow at all in the load. Only then does the normal regulatory operation begin once again, as circumstances require, in the other current direction.

For this purpose, the polarity change of the theoretical value code must first be sensed. Preferably, both the theoretical value code and the actual value code represent their respective current value in a two's complement code. As is well known, a two's complement code is symmetric with respect to zero and its sign is determined by the value of its most significant bit.

In the embodiment illustrated in the drawing, the most significant bit MSB of the theoretical value code is conducted to a zeroing or blocking circuit 9. The blocking circuit can be one or more Schmitt-triggers, edge-controlled multivibrator stages, or other circuits customarily used for generating a signal ts when its binary input signal changes its value.

The signal ts is applied to signal storage circuit 5 where it forces all bits of the theoretical value code to assume the reference value which, in the example under consideration, is zero. The presence of the reference value at the output of signal storage circuit 5 is detected by a decoding element 10 that produces an output signal that is applied to signal storage unit 6 and control unit 7. Control unit 7 blocks (or turns off) all the power transistors $Q_1$ through $Q_4$, thereby blocking the bridge circuit. In the embodiment shown in the drawing where the reference value is zero, decoding element 10 is illustratively an OR element, whose corresponding output signal becomes zero when all of its inputs become zero.

Figure 2:
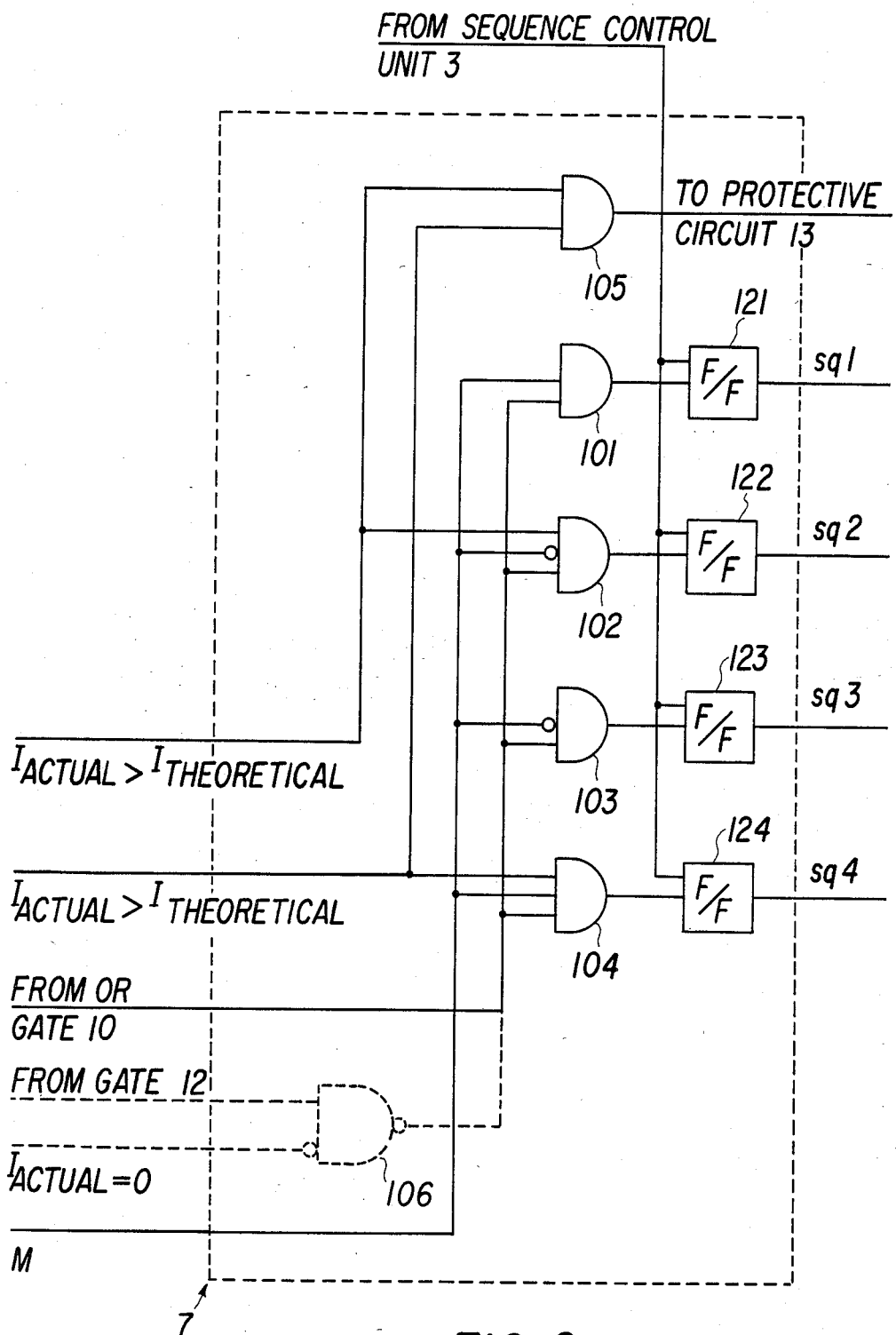
FIG. 2 is a circuit diagram of an illustration for implementing a portion of the diagram of FIG. 1.

Illustrative apparatus for implementing these control functions of control unit 7 are illustrated in FIG. 2. As shown therein, FIG. 2 comprises AND gates 101, 102, 103, 104, each of which produces an output signal sq1, sq2, sq3, sq4, respectively, which control power transistors Q1, Q2, Q3, Q4. Each AND gate produces a high signal which causes the connected power transistor to conduct when all inputs to the AND gate are high; otherwise the output of the AND gate is low which puts the associated power transistor in a blocking or off condition.

A signal representative of the current direction at the terminals M is applied to each of AND gates 101, 102, 103, 104. This signal is inverted at the inputs to AND gates 102 and 103 as indicated by the bubbles at these inputs. If we adopt the convention that this signal is high for a positive current direction, then AND gates 102 and 103 produce a low output which blocks the transistors to which they are connected when the current direction at terminal M is positive. Conversely, when the current direction is negative, AND gates 101 and 104 are blocked. Signals from comparator 4 representing $I_{ACTUAL} < I_{THEORETICAL}$ and $I_{ACTUAL} > I_{THEORETICAL}$ are also applied to AND gates 102 and 104 as shown. As a result, for positive current direction, AND gate 104 produces a high output so that Q4 is conducting if $I_{ACTUAL} < I_{THEORETICAL}$ and a low output so that Q4 is blocking if $I_{ACTUAL} > I_{THEORETICAL}$; and for a negative current direction, AND gate 102 produces a high output so that Q2 is conducting if $I_{ACTUAL} < I_{THEORETICAL}$ and a low output so that Q2 is blocking if $I_{ACTUAL} > I_{THEORETICAL}$. The output from decoding element 10 is also applied to each of the AND gates so that when this output is low, each of the AND gates produces a low output signal thereby blocking the circuit.

The output signal from decoding element 10 is also applied to one input of a gate element 11, whose other input is connected to the particular output of comparator 4 that indicates $I_{ACTUAL} = I_{THEORETICAL}$. As soon as the condition $I_{ACTUAL} = I_{THEORETICAL} = 0$ is fulfilled, the gate element 11 generates a release signal so that terminates the signal ts from blocking circuit 9. As a result, a new theoretical value code, representative of the current that is supposed to flow in the load, is applied from controllable signal storage circuit 5 to comparator 4; and thus the bridge circuit is released for switchover to the new current direction.

While the signal ts forces all bits of the theoretical value code to assume the reference value so that, in this example, all bits (including MSB) become zero, the most significant bit MSB of the theoretical value code is not changed in the circuit 9 after having been conducted thereto. The actual value of this bit is stored in the circuit 9, e.g. in a flipflop (not shown) until the release signal so is generated when the condition $I_{ACTUAL} = I_{THEORETICAL} = 0$ is fulfilled.

Alternatively, the blockage of the bridge circuit can be released when the actual value code reaches a value such as zero. In such case, strobe signal ts can be conducted through signal storage unit 6 to the control unit 7 through a gate element 12 which is controlled by the timing signal. This signal can be used by control unit 7 to block all the power transistors and thereby temporarily block the bridge circuit. This blockage lasts as long as the load current has not yet become zero. When a decoder (not shown) detects that $I_{ACTUAL} = 0$, the blockage can then be released by control unit 7 and the bridge circuit returned to normal operation.

Specific apparatus for accomplishing this alternative function is shown in dotted lines in FIG. 2 as AND gate 106 which is connected to the inputs to AND gates 101–104 in place of the input from OR gate 10. In the absence of strobe signal ts, the output signal from a bubble at the output of AND gate 106 is high, thereby enabling AND gates 101–104. When the strobe signal goes high the output from the output bubble of AND gate 106 goes low until $I_{ACTUAL} = 0$. When the output from the output bubble of AND gate 106 is low, AND gates 101–104 are disabled and the bridge circuit is blocked. However, when the actual value code reaches a value such as zero, i.e., when $I_{ACTUAL} = 0$, the output signal from the output bubble of AND gate 106 goes high, thereby enabling AND gates 101–104 and releasing the bridge circuit. Numerous other circuits for implementing these functions will be apparent to those skilled in the art.

The condition $I_{ACTUAL} = I_{THEORETICAL} = 0$ can also be utilized when the current regulator circuit is switched on. Under the assumption that, at this time, $I_{THEORETICAL}$ is zero, operation of the circuit can be blocked if the actual value code of the current represents a value other than zero so that the regulator is protected in the event of a failure of the current sensing means in stage 1.

As mentioned above, the codes are preferably applied in two's complement form to the buffer units 2 and 5, respectively, from where they are simultaneously applied to comparator 4 under the control of timer 3. The operation of the comparator (and also the current sensing means in stage 1) should be controlled at a clock rate essentially, e.g. 5 to 10 times higher than the maximum switching rate of the power transistors with both rates being synchronized with each other. It should however be noted that a direct comparison of the two codes in two's complement form may lead to errors, and in that event the codes can be transformed, before being compared, to a natural binary code with a sign bit by inverting the bits except the most significant bit (MSB) if the latter has a predetermined value such as "1".

In the previous description, it is assumed that after the theoretical value code changes polarity it is necessary in every case to wait until the actual current has become zero. However, it is also possible that the theoretical value code representative of desired current flow will change again during this time interval and, in particular, that its polarity will change once more thereby reverting back to the original sign. In such a case it is desirable to interrupt the condition, which forces the output of signal storage unit 5 to zero, so that current flow through the load can immediately be again controlled by the theoretical value code. This would correspond to an increase in the maximum regulation bandwidth, which is desirable where an extremely rapid regulation operation is required. To implement this additional function, simple binary circuits can be provided in the blocking circuit 9. Such binary circuits would receive information concerning the new sign change of the theoretical value as well as information that the actual value has not become zero. After the strobe signal ts has been terminated, the comparator 4 resumes normal operation comparing the actual value code with the theoretical value representative of desired current flow.

In some cases, however, the bandwidth of the possible changes in the theorectical value code is limited by a filter circuit (not shown) to a value such that another sign change is possible only after at least several timing periods. In such cases, it is likely that the load current would have dropped to zero before there is another sign change.

The digital regulator circuit described here permits, in very simple fashion in combination with the novel principle of "time-discrete" activation of the power switches, the implementation of reliable protective measures. For example, an alarm signal which blocks the power driver stage 1 through a protective circuit 13 can very easily be generated in the control circuit 7, if the comparator switching unit 4 simultaneously provides the information that the actual value is both greater than and smaller than the theoretical value.

What is claimed is:

1. A digital current regulator circuit for a DC load which is connected in a bridge circuit with electronic power switches and which works in multiquadrant operation with reversible current direction, said regulator circuit comprising:
   a digital comparator that compares a binary actual value code corresponding to the load current with a binary theoretical value code representative of desired load current and generates signals indicating if the actual value is above or below the desired theoretical value of the current or equal thereto;
   means for determining the sign of the theoretical value code, where this sign corresponds to the desired current direction;
   a control unit that continuously holds conducting one electronic power switch in one branch of the bridge and switches on or off a second power switch in such branch in time-discrete fashion depending on whether the theoretical current value is reached and maintains the power switches of the other bridge branches blocked until there is a polarity change in the theoretical value code;
   a timer that controls both the comparator and the control unit and thus the switch-on and switch-off times of the power switches;
   a blocking circuit that blocks the power switches of the bridge circuit when the theoretical value code changes its polarity; and
   a release circuit that terminates the blockage caused by said blocking circuit when the load current reaches a predetermined value at which current distortion is minimized during a change in current direction through the DC load.

2. The apparatus of claim 1 wherein:
   the blocking circuit generates a strobe signal when the theoretical value code changes its polarity;
   the strobe signal causes the theoretical value code applied to the comparator to be equal to the predetermined value; and
   when the actual value becomes equal to the predetermined value, the release circuit terminates the application of the predetermined value to the comparator.

3. The apparatus of claim 1 wherein:
   the blocking circuit generates a strobe signal when the theoretical value code changes its polarity;
   the strobe signal causes the theoretical value code applied to the comparator to be equal to the predetermined value; and
   the releate circuit terminates the application of the predetermined value to the comparator when the theoretical value code changes its polarity again before the actual value becomes equal to the predetermined value; and
   in the absence of an intermediate change of polarity, the release circuit terminates said application when the actual value becomes equal to the predetermined value.

4. The apparatus of claim 1 in which the blocking circuit responds to every change in the binary value of a certain bit of the theoretical value code.

5. The apparatus of claim 1 further comprising a decoding element to which the theoretical value code is applied and from which an output signal is generated when said code equals said predetermined value, said output signal being applied to said release circuit along with a signal from the comparator which indicates whether the actual value code equals the theoretical value code applied thereto.

6. The apparatus of claim 1 wherein the timer controls the control unit with one edge of the timing pulses and controls the application of the actual and theoretical value codes to the comparator with the other edge.

7. A digital current regulator circuit comprising:
   a transistor bridge circuit arranged for a multiquadrant operation,
   means for deriving a binary actual value code representative of the current through a load connected at the output of the bridge circuit,
   means for generating a theoretical value code representative of the desired current flow in said load,
   a digital comparator for comparing the actual value code and the theoretical value code and producing output signals representing the result of such comparison,
   a control unit for the time-discrete unipolar control of said bridge transistors in accordance with a central timing signal,
   means for blocking the bridge circuit when the polarity of the theoretical value code changes, and
   means for terminating the blockage of the bridge circuit as soon as the load current reaches a desired predetermined value.

8. The apparatus of any of the preceding claims wherein said predetermined value is a value representative of no current flow through the load.

* * * * *